UNITED STATES PATENT OFFICE.

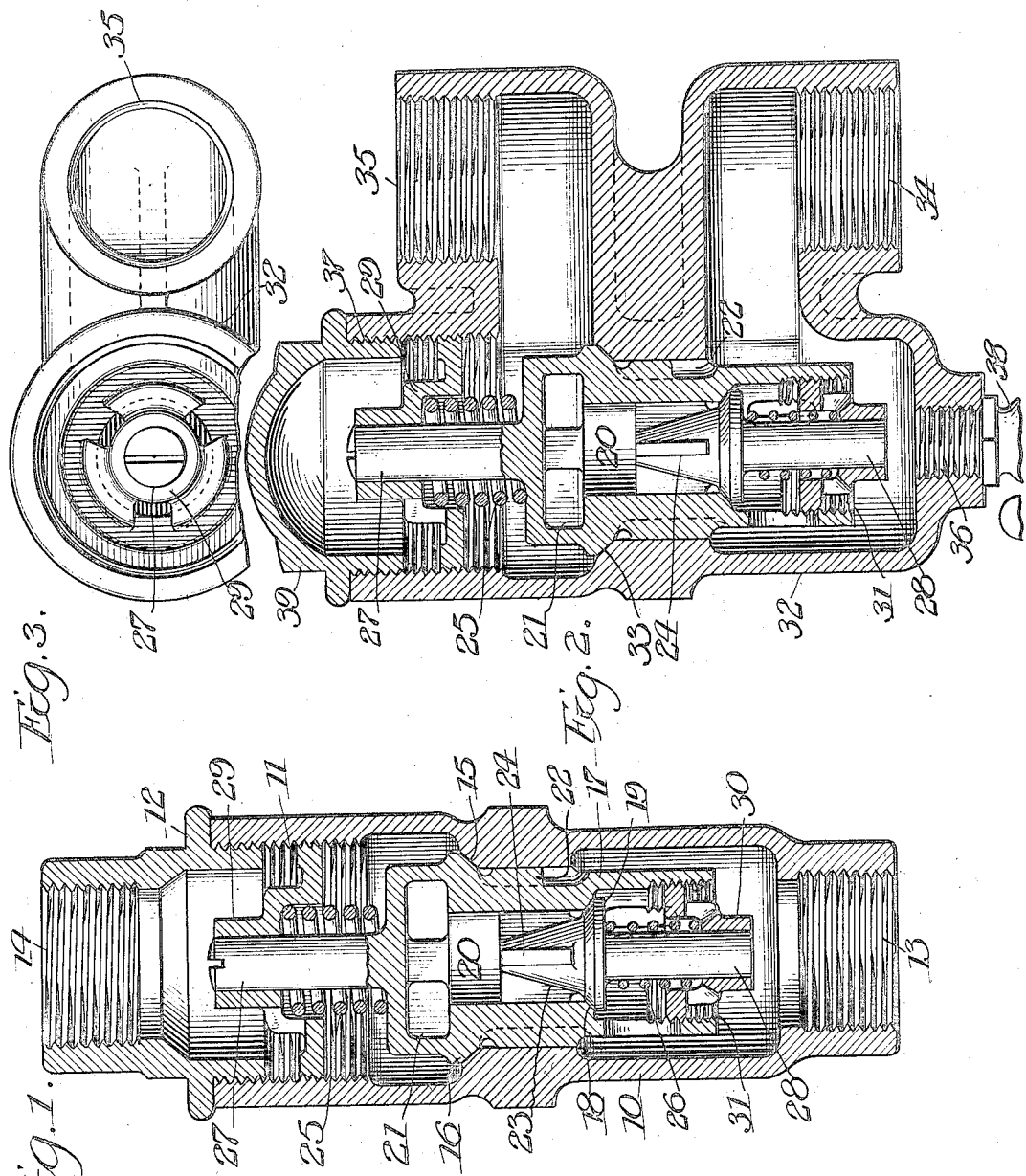

SIVERT UDSTAD, OF AURORA, ILLINOIS.

PRESSURE-REGULATOR.

1,107,383.  Specification of Letters Patent.  Patented Aug. 18, 1914.

Application filed September 12, 1913.  Serial No. 789,454.

*To all whom it may concern:*

Be it known that I, SIVERT UDSTAD, a citizen of the United States, and resident of Aurora, county of Kane, and State of Illinois, have invented certain new and useful Improvements in Pressure-Regulators, of which the following is a specification, and which are illustrated in the accompanying drawings, forming a part thereof.

The invention relates to pressure regulators and more particularly to those of the form comprising a pair of oppositely opening valves, one being yieldingly held to its seat with sufficient force for maintaining the desired pressure and being opened for the escape of fluid when that pressure is exceeded and the other being opened to permit the admission of fluid to the pressure chamber when the pressure is reduced.

The invention contemplates a pressure regulator of the type described wherein the two valves are associated together in a unitary structure.

The object of the invention is to provide a pressure regulator which shall be of simple and inexpensive construction and reliable in operation.

In the accompanying drawings, Figure 1 is a central section view of one form of pressure regulator embodying the improvements provided by the invention, some of the parts being broken away. Fig. 2 is similar to Fig. 1 but shows a different style of pressure regulator embodying the improvements provided by the invention. Fig. 3 is a plan view of the pressure regulator illustrated in Fig. 2.

Referring to Fig. 1 of the drawings the regulator there shown preferably comprises a tubular casing 10, having one end threaded as at 11, to receive a tubular cap, 12. Preferably the opposite end of the casing 10, and the bore of the cap, 12, have threaded sockets, as 13, 14, for connection with the pipes of a fluid pressure system. As shown, the socket, 13, may be directly connected with one of the pipes of a domestic hot water heating system and the socket, 14, may be connected to a water supply. A valve seat 15 is provided intermediate the ends of the casing 10, and an outwardly opening valve 16 coöperates with such seat.

In carrying out the invention the stem 17 of the valve 16 is made tubular, and is provided intermediate its ends with a valve seat 18. An inwardly opening valve 19 coöperates with the valve seat 18. As shown, the bore 20 of the tubular stem 17 of the valve 16 extends through the valve 16 and has lateral openings 21 which communicate with the bore of the casing 10 beyond the valve. Preferably the outer wall of the valve stem 17 is ribbed, as at 22, and these ribs slidingly engage the wall of the casing 10 to guidedly support the valve 16 while still permitting the passage of fluid through the bore of the casing when the valve 16 is raised from its seat. Likewise the stem 23 of the valve 19 is provided with longitudinal ribs 24, and these ribs slidingly engage the wall of the bore of the tubular valve stem 17 to guidedly support the valve 19, while still permitting the passage of fluid through the bore of the valve stem 17 when the valve 19 is opened.

Preferably the valves 16 and 19 are each yieldingly held to their seats by a spring, as 25, 26. The spring 25 is desirably made sufficiently stiff to hold the valve 16 to its seat against the pressure desired to be maintained in front of the valve. The spring 26 on the other hand, is desirably a light spring, and permits the opening of the valve 19 for the admission of fluid into the space in front of the valve 16 when the pressure in said space is reduced below that in the space in rear of or above the valve 16. When the apparatus is used in connection with a domestic hot water heating system, the valve 16 will be opened to permit the escape of water in the system if the pressure in the system is increased above a predetermined amount by the expansion of the water due to its rise in temperature. The valve 19 will be opened to permit the admission of water to the system when the pressure in the system is reduced by the contraction of the water due to a reduction of its temperature.

The valves 16 and 19 preferably have oppositely extending stems 27 and 28, about which the springs 25 and 26 are respectively coiled. These stems conveniently slide through spiders 29 and 30, respectively. These spiders serve as abutments for the springs 25, 26. To permit adjustment of the spring 25 the spider 29 has threaded engagement with the wall of the casing 10 in front of the cap 12. Similarly to permit adjustment of the tension of the spring 26, the spider 30 has threaded engagement with the bore of the tubular stem 17 of the valve 16 adjacent the inner end of the stem, as at 31.

In the form of construction illustrated in Figs. 2 and 3, a casing 32 is provided, having a seat 33 for the valve 16 and threaded sockets 34, 35 at opposite sides of the valve for connection with a pressure chamber and reservoir, respectively, which are offset from the line of the valve seat 33. Openings 36 and 37 in the wall of the casing 32 at opposite sides of the valve seat 33 serve, respectively, for receiving a drain cock 38 and to provide an apening through which the valve 16 and its appurtenances may be removed. In this instance the wall of the opening 37 is threaded to receive a spider 29, as also a solid cap 39.

The form of construction illustrated in Fig. 1 will be conveniently used in places where the amount of space available is limited. The form of construction illustrated in Figs. 2 and 3 provides for the removal of the valve 16 and its appurtenances for inspection and repair without disconnecting the parts which are connected to the sockets 34 and 35, and will conveniently be used where the space occupied by a casing of the form here shown is readily available. Either form of apparatus may be used in connection with a steam boiler, the valve 16 then serving as a safety valve to permit the escape of steam in event a pre-determined pressure is exceeded. On the other hand, the valve 19 will serve as a relief valve to prevent the formation of a vacuum in the boiler when the steam condenses, as by the cooling off of the boiler. The harmful effect of the production of a vacuum within a steam boiler, when the boiler is permitted to cool off rapidly, is thus prevented. Similarly the apparatus may be used as a pressure regulator for any fluid, either liquid, as water, or gases, as steam or air.

I claim as my invention,

1. In a pressure regulator, in combination, an axially movable valve having an inwardly extended tubular stem, the bore of the stem being continued through the valve, a second valve sliding in the bore of the stem intermediate its ends and controlling the opening therethrough, a spider running in the bore of the said stem beyond the second mentioned valve from the first mentioned valve and having threaded engagement with the wall of the said stem and a spring reacting between the spider and the second mentioned valve.

2. In a pressure regulator, in combination, a tubular casing having a valve seat intermediate its ends, a valve coöperating with the said seat and having a tubular stem, the bore of the stem being extended through the valve, a second valve sliding in the bore of the said stem and controlling the opening therethrough, the two valves acting in opposite directions, a pair of guiding and pressure regulating plates one having threaded engagement with the wall of the case in front of the first mentioned valve and the other having threaded engagement with the stem of the first mentioned valve in front of the second mentioned valve and a spring reacting between each of the said guiding and pressure regulating plates and the corresponding valve.

3. In a pressure regulator, in combination, a chambered casing having a valve seat intermediate its ends, an opening in its wall directly above the valve seat, and a pair of axially alined oppositely facing sockets for the connection of fluid pipes, one at each side of the valve seat, the line of said sockets being offset from the line of the valve seat and opening, a removable cap covering the said opening, and a pair of oppositely acting valves, one coöperating with the said valve seat and having an opening therethrough and the other controlling the opening in the said valve which is provided with an opening, both of said valves being removable through the said opening in the wall of the case upon removal of the said cap.

SIVERT UDSTAD.

Witnesses:
CHARLES B. GILLSON,
E. M. KLATCHER.